US009929824B2

(12) United States Patent
Scurrell et al.

(10) Patent No.: US 9,929,824 B2
(45) Date of Patent: Mar. 27, 2018

(54) NETWORKED PROGRAMMABLE MASTER CLOCK BASE STATIONS (71) Applicant: TIMECODE SYSTEMS LIMITED, Worcester (GB)

(72) Inventors: Paul Scurrell, Worcester (GB); Paul Leslie Bannister, Bampton (GB)

(73) Assignee: TIMECODE SYSTEMS LIMITED, Worcester (GB)

( * ) Notice: Subject to any disclaimer, the term of this patent is extended or adjusted under 35 U.S.C. 154(b) by 121 days.

(21) Appl. No.: 15/005,599

(22) Filed: Jan. 25, 2016

(65) Prior Publication Data
US 2016/0218820 A1 Jul. 28, 2016

Related U.S. Application Data (60) Provisional application No. 62/240,352, filed on Oct. 12, 2015, provisional application No. 62/119,873, filed on Feb. 24, 2015, provisional application No. 62/118,665, filed on Feb. 20, 2015, provisional application No. 62/107,632, filed on Jan. 26, 2015.

(51) Int. Cl.
H04J 3/06 (2006.01)
H04N 5/073 (2006.01)
H04N 5/232 (2006.01)
H04N 5/247 (2006.01)

(52) U.S. Cl.
CPC ......... *H04J 3/0661* (2013.01); *H04N 5/0733* (2013.01); *H04N 5/23206* (2013.01); *H04N 5/247* (2013.01)

(58) Field of Classification Search
CPC ... H04J 3/0661; H04N 5/247; H04N 5/23206; H04N 5/0733
See application file for complete search history.

(56) References Cited

U.S. PATENT DOCUMENTS

| 5,557,423 | A  | 9/1996  | Phillips et al. |
| 5,892,552 | A  | 4/1999  | Kim |
| 6,831,729 | B1 | 12/2004 | Davies |
| 7,024,155 | B2 | 4/2006  | Gosieski, Jr. |
| 7,200,320 | B1 | 4/2007  | Denecke et al. |
| 7,321,601 | B2 | 1/2008  | Rogerson et al. |

(Continued)

FOREIGN PATENT DOCUMENTS

| EP | 2 161 921 A1 | 3/2010 |
| JP | 2007-081686 A | 3/2007 |
| WO | 02/01775 A1 | 1/2002 |

OTHER PUBLICATIONS

Extended Search Report dated Feb. 7, 2017 in EP Application No. 16193386.6.

(Continued)

*Primary Examiner* — Peter Chau
(74) *Attorney, Agent, or Firm* — Brown Rudnick LLP (57) ABSTRACT Methods and systems for transmitting timecode and metadata to networked devices can include identifying one or more network devices capable of receiving timecode and sync information, generating a communication signal comprising timecode and sync information by a device having an internal clock, distributing the communication signal over a network to the identified network devices, and synchronizing the identified networked devices during an event.

6 Claims, 7 Drawing Sheets

(56) References Cited

U.S. PATENT DOCUMENTS

| | | | |
|---|---|---|---|
| 7,324,743 B2 | 1/2008 | Hosoda | |
| 7,398,411 B2 | 7/2008 | Zweigle et al. | |
| 7,436,899 B2 | 10/2008 | Rogerson et al. | |
| 7,552,193 B2 | 6/2009 | Carro | |
| 7,555,196 B1 | 6/2009 | Crawford et al. | |
| 7,593,619 B2 | 9/2009 | Yamasaki | |
| 7,609,608 B2 | 10/2009 | Rogerson et al. | |
| 7,633,551 B2 | 12/2009 | Sullivan | |
| 7,673,316 B2 | 3/2010 | Incentis Carro | |
| 7,711,443 B1 * | 5/2010 | Sanders | G08C 25/02 381/80 |
| 7,743,161 B2 | 6/2010 | Dey et al. | |
| 7,881,587 B2 | 2/2011 | Shinkai et al. | |
| 7,913,157 B1 | 3/2011 | Stoakley et al. | |
| 7,929,902 B1 | 4/2011 | Sanders et al. | |
| 7,933,203 B2 | 4/2011 | Hahm | |
| 8,019,194 B2 | 9/2011 | Morrison et al. | |
| 8,520,999 B2 * | 8/2013 | Squyres | G11B 27/10 386/210 |
| 8,643,779 B2 | 2/2014 | Suess et al. | |
| 8,878,708 B1 * | 11/2014 | Sanders | H03M 1/70 341/139 |
| 9,041,813 B1 | 5/2015 | Yakay et al. | |
| 9,049,349 B2 | 6/2015 | Ganesan et al. | |
| 2001/0044826 A1 | 11/2001 | Ludwig et al. | |
| 2002/0009974 A1 * | 1/2002 | Kuwahara | H04J 3/0685 455/67.16 |
| 2002/0034255 A1 | 3/2002 | Zetts | |
| 2002/0091495 A1 | 7/2002 | Woodroffe | |
| 2003/0193577 A1 | 10/2003 | Doring et al. | |
| 2006/0035663 A1 | 2/2006 | Cheng | |
| 2006/0053455 A1 | 3/2006 | Mani et al. | |
| 2007/0216691 A1 * | 9/2007 | Dobrin | H04N 5/073 345/473 |
| 2007/0250901 A1 | 10/2007 | McIntire et al. | |
| 2008/0122986 A1 * | 5/2008 | Diederichsen | H04N 21/2343 348/705 |
| 2010/0122168 A1 | 5/2010 | Silberstein et al. | |
| 2010/0158473 A1 | 6/2010 | Wayne et al. | |
| 2010/0195978 A1 | 8/2010 | Ekchian et al. | |
| 2011/0052137 A1 | 3/2011 | Cowie | |
| 2011/0149093 A1 | 6/2011 | Kang et al. | |
| 2011/0179196 A1 | 7/2011 | Friedman | |
| 2011/0249128 A1 * | 10/2011 | Squyres | G11B 27/10 348/207.11 |
| 2011/0296474 A1 | 12/2011 | Babic | |
| 2012/0044001 A1 * | 2/2012 | Tanaka | H03L 7/235 327/156 |
| 2012/0050591 A1 | 3/2012 | Horikawa | |
| 2012/0069943 A1 | 3/2012 | Lim et al. | |
| 2012/0236201 A1 | 9/2012 | Larsen et al. | |
| 2013/0114481 A1 | 5/2013 | Kim et al. | |
| 2013/0194496 A1 * | 8/2013 | Atherton | H04N 21/4307 348/515 |
| 2013/0301635 A1 | 11/2013 | Hollabaugh et al. | |
| 2013/0307971 A1 | 11/2013 | Ganesan et al. | |
| 2014/0085136 A1 | 3/2014 | Alpert et al. | |
| 2014/0169174 A1 * | 6/2014 | Gilson | H04L 45/24 370/237 |
| 2014/0169768 A1 * | 6/2014 | Webb | H04N 5/04 386/285 |
| 2014/0307805 A1 | 10/2014 | Ihara | |
| 2014/0355947 A1 | 12/2014 | Slamecka et al. | |
| 2015/0029396 A1 | 1/2015 | Scurrell | |
| 2015/0043697 A1 * | 2/2015 | Achanta | H04B 3/04 375/371 |
| 2015/0098690 A1 | 4/2015 | Abbate et al. | |
| 2016/0021292 A1 * | 1/2016 | Zhang | H04N 5/23206 348/211.2 |
| 2016/0218820 A1 | 7/2016 | Scurrell et al. | |
| 2017/0053674 A1 | 2/2017 | Fisher et al. | |
| 2017/0104821 A1 | 4/2017 | Scurrell | |
| 2017/0104896 A1 | 4/2017 | Scurrell | |
| 2017/0105054 A1 | 4/2017 | Bannister et al. | |

OTHER PUBLICATIONS

"An ultra compact timecode, genlock and word clock generator with transceiver," Timecode Systems minitrx+ quick start guide. Retrieved from the Internet: URL:http://www.timecodesystems.com/wp-content/uploads/2015/09/Timecode-Buddy-TRX-Plus-Quickstart-guide-web.pdf.

"Digital cellular telecommunications system (Phase 2); Radio subsystem synchronization (GSM 05.10)," European Telecommunication Standard (ETS) 300 579, vol. SMG2, Sixth Edition, Nov. 1, 1996 (Nov. 1, 1996), XP014013776.

Extended Search Report dated Feb. 7, 2017 in EP Application No. 16193387.4.

Partial Search Report dated Jan. 27, 2017 in EP Application No. 16193388.2.

F. Beacham, "Precision Time Code and Genlock Bring Wireless Action Cameras Into Live Broadcasting—The Broadcast Bridge Connecting IT to Broadcast," Jun. 23, 2015. Retrieved from the Internet: URL:https://www.thebroadcastbridge.com/content/entry/2879/precision-time-code-and-genlock-bring-wireless-action-cameras-into-live-bro.

"Clockit Timecode ACL 204 Lockit" Rev. 1.00 manual by Ambient Recording GmbH, 24 pages, copyright 2012.

"Clockit Timecode ACL 204 Lockit" Rev. 3.11 manual by Ambient Recording GmbH, 32 pages, copyright 2013.

"The Trilevelsync Lockit Box ACL 203" manual by Ambient Recording GmbH, 9 pages, from about 2012 or earlier.

Non-Final Office Action dated Jul. 24, 2017 in U.S. Appl. No. 15/290,709.

Response to OA dated Jul. 24, 2017, filed Jul. 25, 2017 in U.S. Appl. No. 15/290,709.

Non-Final Office Action dated Aug. 3, 2017 in U.S. Appl. No. 15/290,709.

Response to OA dated Aug. 3, 2017, filed Aug. 21, 2017 in U.S. Appl. No. 15/290,709.

Supplemental Response to OA, filed Aug. 22, 2017 in U.S. Appl. No. 15/290,709.

Non-Final Office Action dated Oct. 5, 2015 in U.S. Appl. No. 13/948,252.

Response to OA dated Oct. 5, 2015, filed Jan. 4, 2016 in U.S. Appl. No. 13/948,252.

Final Office Action dated May 2, 2016 in U.S. Appl. No. 13/948,252.

Response to OA dated May 2, 2016, filed Aug. 1, 2016 U.S. Appl. No. 13/948,252.

Non-Final Office Action dated Sep. 23, 2016 in U.S. Appl. No. 13/948,252.

Response to OA dated Sep. 23, 2016, filed Mar. 17, 2017 in U.S. Appl. No. 13/948,252.

Final Office Action dated Jun. 2, 2017 in U.S. Appl. No. 13/948,252.

Response to OA dated Jun. 2, 2017, filed Jun. 20, 2017 in U.S. Appl. No. 13/948,252.

Non-Final Office Action dated Aug. 17, 2017 in U.S. Appl. No. 13/948,252.

Response to OA dated Aug. 17, 2017, filed Aug. 25, 2017 in U.S. Appl. No. 13/948,252.

Notice of Allowance dated Oct. 12, 2017 in U.S. Appl. No. 15/290,709 (18 pages).

Non-Final Office Action dated Dec. 11, 2017 in U.S. Appl. No. 15/290,125.

* cited by examiner

NETWORKED PROGRAMMABLE MASTER CLOCK BASE STATIONS

CROSS-REFERENCE TO RELATED APPLICATIONS

The present application is also related to and claims priority pursuant to 35 U.S.C. § 119 to U.S. Ser. Nos. 62/107,632 (filed Jan. 26, 2015), 62/119,873 (filed Feb. 24, 2015), 62/118,665 (filed Feb. 20, 2015), and 62/240,352 (filed Oct. 12, 2015), the contents of which are each incorporated herein by reference in their entirety.

TECHNOLOGICAL FIELD

This disclosure relates audio and video processing systems, and more particularly to networked programmable master clock base stations.

BACKGROUND

Modern audio and video processing systems typically use multiple cameras and multiple audio tracks for simultaneous audio and video recording of their subjects. For the multiple recordings to be effectively employed in post-production, where all of the raw recording materials are edited into a final recording, the audio and video signals from all utilized cameras and sound recorders must be carefully synchronized.

SUMMARY

Many media systems are now rooted in file-based recording methods for video and sound media. Relevant recording devices are no longer limited to professional video movie cameras, but now also include personal media devices (e.g., action cameras developed by GoPro®). These multi-camera or multi-device configurations inherently pose significant processing problems. That is, the devices must be synchronized together so that each media clip is embedded with timecode (e.g., linear time code "LTC") information and/or so that the video sources' acquisition rates are synchronized with each other (i.e., genlocked). Timecode information is used to identify a location in digital systems and on time-based media (e.g., audio or video tape) and is relied on for synchronization and reference throughout the audio, video, and post-production process. A Society of Motion Picture and Television Engineers ("SMPTE") genlock (Tri-level and Bi-Level sync signals) is an industry standard signal waveform that is relied on for synchronization and reference throughout the audio, video, and post-production process. Similarly, the audio and video signals from one camera at a given point in time may not properly align with the audio and video signals from a second camera. Without synchronization, the audio signals from one audio recorder at a given point in time may not properly align with the audio and video signals from a second camera.

For example, the background noise of a train passing quickly through one camera's field of vision could be caught at a different perceived point in time on a second camera, thus resulting in identifying the train and its associated sounds at time point 00:01:10:15 (00 hour:01 minute: 10 second: 15 frame), whereas the second camera might capture the moving train at point 00:01:13:25, thus potentially resulting in no train even being shown or heard by the second camera if both cameras' recordings are set to the first camera's 00:01:10:15 to 01:12:30 range of time as the basis for post-production of the train's filmed movements.

In other words, if the devices are not synced, then each recorded clip of media will require manual syncing during post-production processing. This processing is both time consuming and expensive. During live events, streaming camera feeds pose an even greater problem because there is no or a limited opportunity for post-production processing. Cameras used for broadcasting live productions need to be synchronized together when the media is being recorded (e.g., in real-time). Therefore, ensuring that the cameras are genlocked so that the cameras are in phase or synchronized with each other is important.

The systems, devices, and methods described throughout this disclosure provide a moveable, networked, multi-channel, programmable timecode and synchronization device, and, in some cases, a two-way data or bi-directional exchange is accomplished using the spare bandwidth associated with each timecode frame transmission. This data can include unit status information between connected devices that is exchanged in between synchronization data and/or control data. The timecode, synchronization, and/or control information can be provided to networked devices through wireless and wired networks.

In one aspect, a method to transmit timecode and metadata to networked devices includes identifying one or more network devices capable of receiving timecode and sync information, generating a communication signal comprising timecode and sync information by a device having an internal clock, distributing the communication signal over a network to the identified network devices, and synchronizing the identified networked devices during an event.

In another aspect, a device for timecode and metadata distribution includes a timecode generator including an internal clock, the timecode generator being configured to generate timecode information, an RF transceiver configured to transmit and receive the timecode information using an RF signal, a network controller configured to provide wired and wireless network access for distribution of the timecode information; and a display configured to display the timecode information to a user.

In yet another aspect, a system includes a network, a base station, a display a display configured to display the timecode information to a user, and at least two cameras in communication with the base station over the network. The base station includes a timecode generator including an internal clock, the timecode generator configured to generate timecode information, an RF transceiver configured to transmit and receive the timecode information using an RF signal, and a network controller configured to provide wired and wireless access to the network access for distribution of the timecode information.

Implementations can include one or more of the following features.

In some implementations, the method further includes sending control instructions to the identified network devices over a second network and receiving status information from the network devices over the second network.

In other implementations, synchronizing the identified networked devices comprises associating media information with the communication signal to create indexed media information and storing the indexed media information on a removable storage device.

In some implementations, the communication signal is simultaneously transmitted over a wired and wireless network.

In other implementations, the synchronization includes receiving and providing timecode and sync information to the identified networked devices.

In other implementations, the event is a live or pre-recorded activity recorded by two or more cameras.

In some implementations, the synchronization includes synchronizing sync and control data across each of the identified network devices.

In other implementations, the method further includes generating the timecode and sync information using the internal clock.

In some implementations, the method further includes calibrating the internal clock using an external sync input.

In other implementations, the external sync input includes GPS coordinates and timing information, and/or NTP or PTP network timing information.

In some implementations, at least, one of the identified network devices is a video camera.

In other implementations, the video camera is capable of recording audio and video signals.

In some implementations, the video camera is a personal video camera.

In other implementations, the method further includes, identifying one or more memory devices and synchronizing information representing the event.

In some implementations, the device further includes a non-transitory computer readable media device storing instructions that are executable by a processing device to perform operations, the operations including identifying one or more network devices capable of receiving time code and sync information, generating a communication signal comprising timecode and sync information by a device having an internal clock, distributing the communication signal over a network to the identified network devices, and synchronizing the identified networked devices during an event.

In other implementations, the time code generator further comprises a timecode oscillator configured to provide timecode and genlock information through at least one of a TCXO reference oscillator, an OXCO reference oscillator, and a rubidium atomic clock.

In some implementations, the device further includes a GPS receiver module in communication with the timecode generator, the GPS receiver module being configured to provide a sync signal to the internal clock. The device includes hardware, firmware, and software to provide a timing signal to the internal clock from NTP or PTP network timing protocols.

In other implementations, the base station is configured to identify another camera capable of receiving timecode data.

In some implementations, the device further includes a module in communication with an external synchronization source, the external module being configured to encode and decode NTP and PTP network timing protocols.

Implementations can include one or more of the following advantages.

Existing timecode technology allows for the audio and video recordings from multiple cameras to be synchronized, but the current equipment used for such synchronization has limited functionality. The systems, devices, and methods described herein provide flexible and scalable timecoding technologies by expanding the typical capabilities of a timecode generator so that the timecode generator can function as a generator, transceiver, and complex connectivity hub. These developments transform a timecode generator into a networked programmable master clock base station (also referred to as a "base station") because the base station functions as a master timecode and sync generator. That is, the base station generates data using an internal master clock while simultaneously distributing, via wired and wireless networks, timecode, synchronization data and/or control data to networked devices needing timecode data. In some cases, the base station can gather camera status information using a closed network (e.g., an RF network), and display this compiled information over a graphical user interface ("GUI") of a computing device. This status information can include SD card status, battery status, recording status or a combination thereof.

The devices, systems, and methods described throughout this disclosure also enables a user to log content (e.g., a contributor's name, location, or program member) and associate the content with the captured media in real time. The logged content is associated with the timecode or genlock information of the media. This allows the logged content to be stored as searchable data that is easily identified during post-processing.

The described devices, systems and methods also can, over a wireless connection, continuously re-sync a receiving or "slave" device (e.g., an audio or video recorder) with the base station. This helps to eliminate drift throughout the system and keep the system devices synchronized. In some cases, the base station can automatically identify the receiving or slave devices near the base station. This can help automate device synchronization throughout a location (e.g., within a stadium).

The described devices, systems and methods also enable accurate timecode and metadata to be displayed wirelessly on non-network devices using software applications. This information can be transferred to a software application running on the non-network device. In some cases, the timecode information can be displayed on the various devices in real-time, which makes this information easily accessible and readily available.

These and other aspects, features, and implementations, and combinations of them, may be expressed as apparatus, methods, methods of doing business, means or steps for performing functions, components, systems, program products, and in other ways.

Other aspects, features, and advantages will be apparent from the description and drawings, and from the claims.

BRIEF DESCRIPTION OF THE DRAWINGS

Features and advantages of the claimed subject matter will be apparent from the following detailed description of embodiments consistent therewith, which description should be considered with reference to the accompanying drawings?

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

In general, this disclosure relates to a scalable system that facilitates synchronization across, for example, professional and personal camera, and sound equipment. This synchronization includes providing timecode, genlock, and metadata to networked devices using wired and/or wireless networks systems. The scalable system includes devices, transceivers, controllers, and/or adapters that cooperate to ensure that each camera and/or sound recording device receives accurate linear timecode ("LTC") and/or sync (e.g., Word Clock or Genlock) signals. In some examples, a two-way data exchange is accomplished using the spare bandwidth associated with each timecode frame transmission. The transmitted and received data can be multiplexed from many sources to form an RF network referred to herein as "BLINK." Examples of such sources including devices, modules, transceivers, controllers and/or adapters and methods are described herein.

Figure 1:
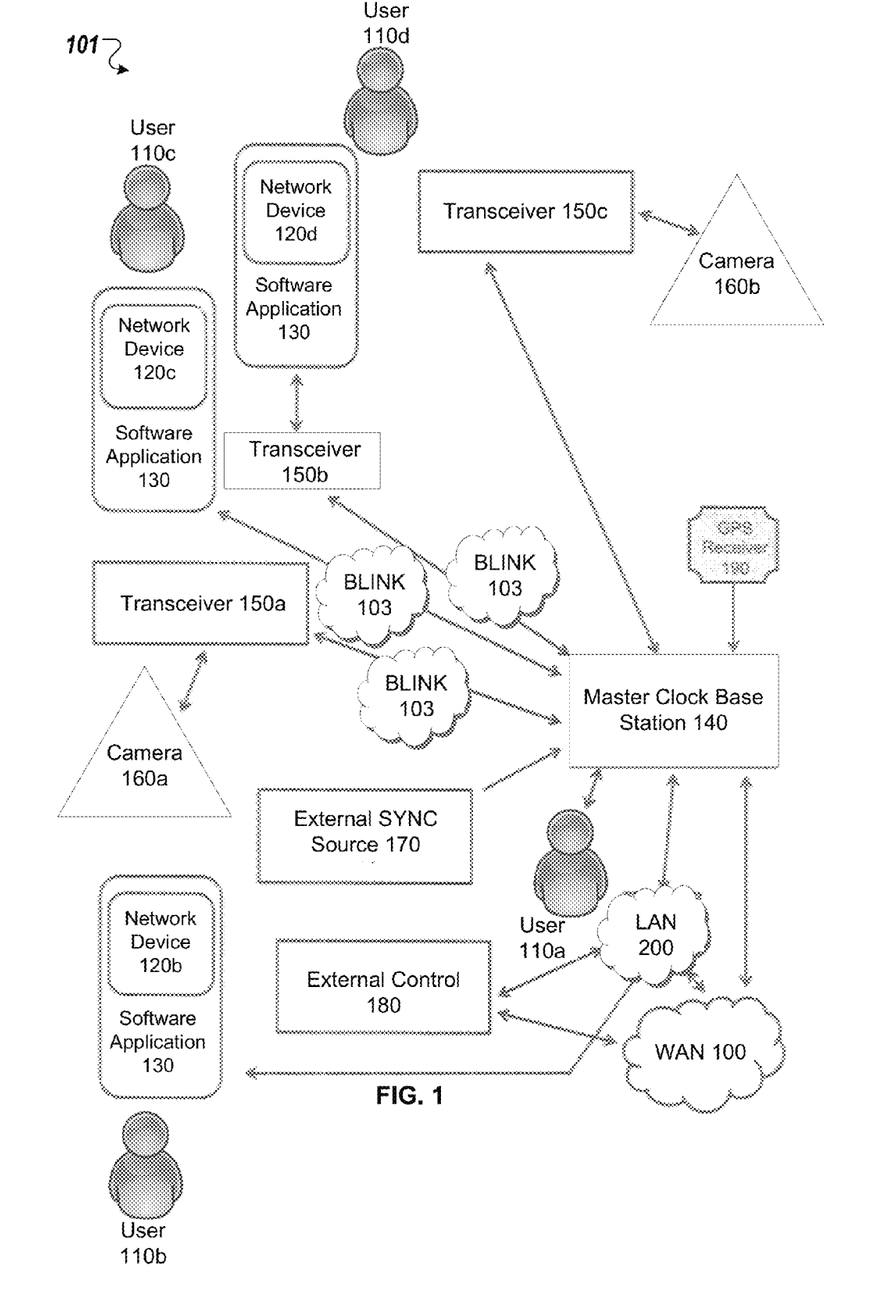
FIG. 1 is a schematic illustrating an exemplary network environment in which one embodiment of the disclosure may operate.

Referring to FIG. 1, a system 101 includes one or more networked devices 120b-d, one or more cameras 160a-b, and a base station 140. In the example of FIG. 1, the base station 140 is configured to provide timecode, genlock, metadata or a combination thereof to the networked devices 120b-c and cameras 160a-b via wired and/or wireless network systems using one or more transceivers 150a-c. One or more users 110a-d can view the cameras 160a-b using the base station 140 or by using the network devices 120b-c that are connected to a wide area network ("WAN") 100 (e.g., the Internet), a local area network ("LAN") 200 or by communicating with the transceivers 150a-c over a radio frequency "RF" network (e.g., a BLINK network 103).

The base station 140 is a networked programmable timecode generator. The device is intended to be moveable between sites and stationary during use. For example, the device can be installed in a rack-mountable format for semi or permanent installation, which is compatible with a motion picture filming location, permanent venue, or temporary venue. The base station 140 may generate timecode data through a temperature compensated crystal oscillator ("TCXO") reference oscillator, an oven-controlled crystal oscillator ("OXCO") reference oscillator, a rubidium atomic clock, GPS time, NTP, or similar technology. The transceivers 150a-c can receive data transmitted by the base station 140 and relay data back to the base station 140. Data can be gathered from the transceivers 150a-c directly or from the network devices 120b-d connected to the transceivers 150a-c. The transceivers 150a-c can be embedded or physically connected to the transceivers 120a-d.

The network devices 120b-d can be a computer, a mobile phone, a handheld tablet device, or any other mobile network device capable of accessing the WAN 100 or the base station 140 using of the transceivers 150a-c. The network devices 120b-c can run the software application 130. The software application 130 can receive and use the timecode data, status data, configuration data and metadata created and transmitted by the base station 140. The software application 130 can also receive available metadata from the cameras 160a-b, which the base station 140 received through the transceivers 150a-c via the sub-GHz RF network. After processed, this information can also be pushed over onto a network (e.g., the WAN 100, LAN 200, or the BLINK 103) for the software application 130 to store and use in a database.

The transfer of metadata from the cameras 160a-b can simplify post-production processing. For example, a user can associate info or notes with specific content during filming because the logged information can simplify the identification or tracking of specific clips during post-production. The logged information becomes 'searchable metadata'. To allow this user input content to be 're-linked' with the original media files some identifiers must be embedded to enable the software to find the correct notes for the correct media clips. The transmitted data and the metadata from the recording camera can function as these key identifiers, which enables re-linking in standard non-linear editing ("NLE") systems and/or third-party logging applications.

The cameras 160a-b can receive data electrical signals and waveforms packets that allow reconstruction of timecode, genlock and configuration data that is transmitted by the base station 140 through any one of the transceivers 150a-c. The connection between transceivers 150a-c and the camera 160a-b can be via a wired or wireless interface. The camera 160a operates in the same manner as the camera 106b and is designed to show that the system is scalable and repeatable.

The transceivers 150a-c can be used to either transmit the accurate synchronization and configuration data to other devices when operating in a control mode (e.g., a "master" mode), or to receive highly accurate synchronization or configuration data from another device when operating in a dependent mode (e.g., in "slave" mode). In operation, for example, the base station 140 provides timecode and sync data to the transceivers 150a-c, which is relayed to the cameras 160a-b. In this example, the cameras 160a-b are configured as devices operating in a "slave" or dependent mode while the base station 140 is operating in a "master" or control mode. In some examples, the transceivers 150a-c includes an internal clock. If the RF signal from the base station 140 is corrupt or out of range, then the transceivers 150a-c rely on their respective internal clocks. When the transceivers 150a-c receives reliable data packets from the base station 140, the transceivers 150a-c can soft-sync back to lock with a master device (e.g., the base station 140). For example, the accurate internal generator (e.g., internal clock) of the transceivers 150a-c is constantly soft-synced from the received and decoded RF data packets when the transceivers 150a-c are operating in slave mode. This helps to keep the transceivers internal clocks in phase or synchronized with the other system devices to reduce possible drift when the transceivers 150a-c loses contact with the base station 140.

In some examples, initial sync lock accuracy between the base station 140 and the transceivers 150a-c is about 20 microseconds and subsequently improves to a lock accuracy of 1 to 5 microseconds after approximately 1 minute.

In some cases, the base station 140, the cameras 150a-b, or other components of the system 101 can be controlled remotely using an external control 180. As shown in FIG. 1, the external control 180 can be via the LAN 200 or the WAN 100. The external control 180 can enable remote control of desired system functions, including activating desired cameras, resyncing specific devices, requesting device status information, and other useful control features.

Referring to FIGS. 1-4, a GPS receiver 190 can be an external or internal module that acts as an external sync source 170 to the base station 140. The GPS receiver 190 provides the base station 140 with public information external information 191. An external sync source 170 is an external source of LTC, Genlock, SDI, or another sync format (e.g., a Precision Time Protocol ("PTP") format or a Network Time Protocol ("NTP") format. This sync signal can be used to re-clock the internal generator within the base station 140. The The LAN 200 can be an external or internal LAN controller/interface that can be used to view status, configure and remote control any element within the system. The software application 130 gets required timecode, sync, and metadata from wired or wireless interfaces of the network devices 120b-d. These interfaces can be internal or external to the network devices 120b-d device hardware.

The data can be collated and shared with the users 110a-d over the LAN 200, the WAN 100 and/or the BLINK network 103. Therefore, a user can be located near or remote from the base station 140. For example, the user 110a can be physically in the same location as the base station 140, or the users 110b-d can be located at a remote location using the LAN 200 or the WAN 100.

In this example, the WAN 100 and the LAN 200 provide network access to the components of the system 101. The network access may be wired or wireless, and may connect to the Internet or some other type of network. A network may be part of a larger network that provides network access to the elements of the environment. The 2-way data exchange and sync data between the base station 140 and all related components (e.g., the transceivers 150a-c) can be interfaced with and connected to WAN 100, in real time or at any time in the future.

Figure 2:
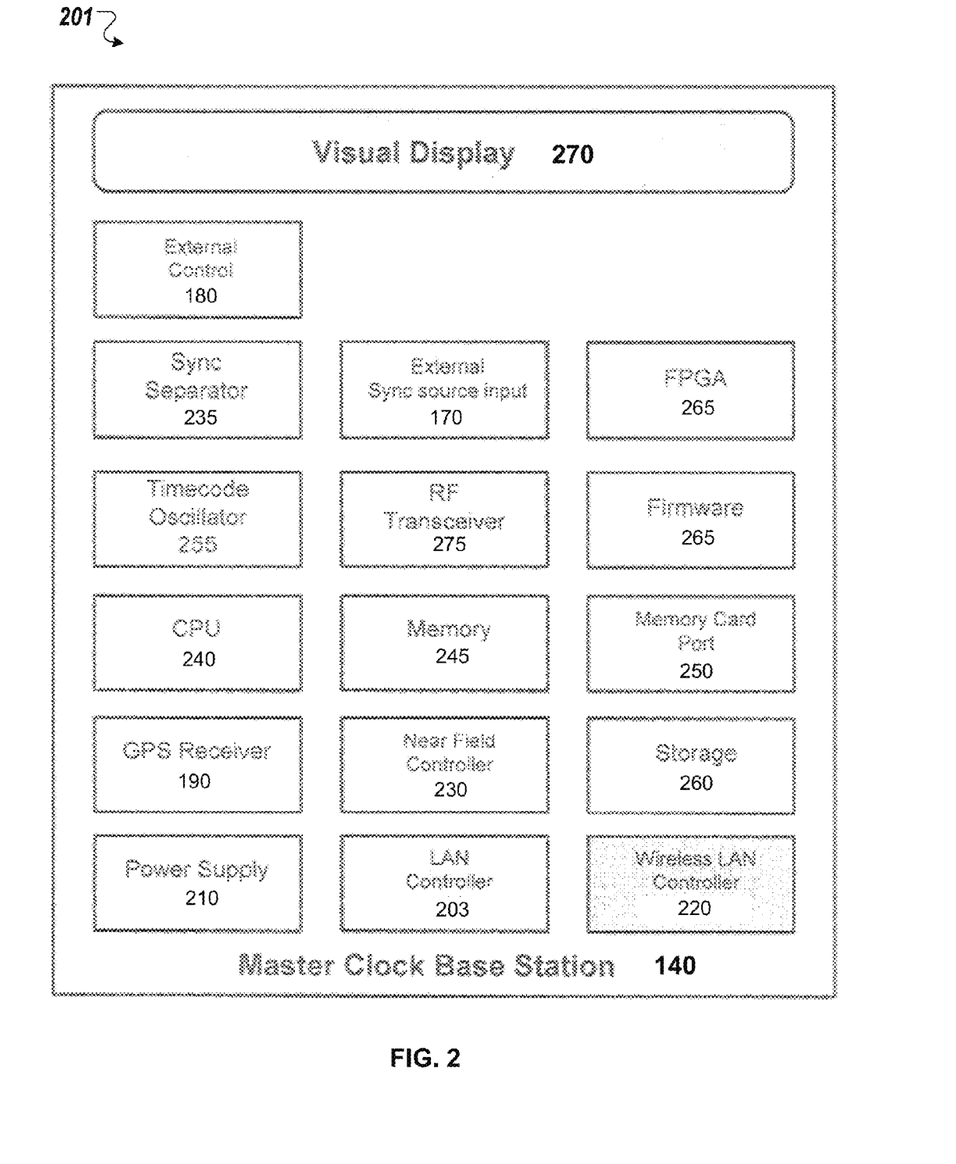
FIG. 2 is a schematic illustrating a networked programmable master clock base station in accordance with one embodiment of the present disclosure.

FIG. 2 is a schematic further illustrating the components 201 of the base station 140. For example, the base station 140 also includes a sync separator 235, a timecode oscillator 255 a CPU 240, a power supply 210, an RF transceiver 275, memory 245, a near field controller 230, a LAN controller 203, a programmable gate array code ("FPGA") 265, a memory card port 250, storage 260, and a wireless LAN controller 220. The base station 140 can also include further one or more software or hardware modules for encoding and decoding of NTP and PTP network timing protocols in communication with the base station 140.

The power supply 210 is the primary source of power for the device and is intended to be constantly charged through a standard AC or DC power supply. The LAN controller 203 provides the base station 140 with wired network connectivity to the internet, an intranet, or any other local area network using Ethernet or similar protocols. The wireless LAN controller 220 provides the base station 140 with wireless network connectivity to the Internet, an intranet, or any other wireless network using wired and wireless protocols.

The near field controller 230 provides wireless network access to the WAN, an intranet, or another network using NFC, Bluetooth, or similar protocols. The CPU 240 serves as the primary microprocessor for the base station 140 and can have a single or multiple cores. The CPU 240 may include one or more microprocessors and/or processing devices. Generally, the CPU 240 may include any appropriate processor and/or logic that are capable of receiving and storing data, and of communicating over a network.

The memory 245 is the primary memory component for the base station 140 and can be SRAM, DRAM, or any other standard volatile or non-volatile memory. For example, the memory 245 can include a hard drive and a random access memory storage device, such as a dynamic random access memory, machine-readable media, machine-readable hardware storage devices, or other types of non-transitory machine-readable storage devices. The memory card port 250 is a physical port allowing the base station 140 to utilize external flash memory cards including SD, mini-SD, micro-SD, or any other similar format.

The timecode oscillator 255 provides the base station 140 with timecode and genlock information generated through a TCXO reference oscillator, an OXCO reference oscillator, a rubidium atomic clock, or similar technology. The timecode oscillator 255 can also be synchronized with an external timing reference such as GPS receiver 190, or another external sync source 170 using the sync separator 235.

The storage 260 is the primary storage component for the base station 140 and can be a hard disk drive, a solid state drive, or any other data storage component. The field-programmable gate array code 265 ("FPGA") is the control program or firmware for the generation of timecode and sync data. It is also the control program for an RF transceiver 275.

The frequency band that RF transceiver 275 of the base station 140 uses for data communication is a sub-GHz long range robust data format. For example, the base station 140 can communicate with the system devices using the ISM-sub-GHz band (865 MHz to 928 MHz). The sub-GHz long range robust data format (also referred to as a BLINK protocol) can be the protocol described in U.S. Application Ser. No. 62/240,352, filed on Oct. 12, 2015, which is incorporated by reference in its entirety. The base station 140 can transfer timing data and configuration data within data packets using the BLINK protocol over the BLINK network 103. In between the timing data packets, the base station 140 can receive or send configuration or status information from other devices (e.g., cameras, sound devices, and lens devices) over the BLINK network 103.

The frequency band that the base station 140 uses to communicate with the WAN 100 or with the network devices 120b-c can be Wi-Fi, Bluetooth or other wireless protocols in the appropriate bands (e.g., in the 2.4 GHz and 5 GHz bands). The base station 140 can communicate with the WAN 100 via LAN 200. The system 101 is designed for both of these wireless and wired networks to co-exist and simultaneously transmit and receive.

In some examples, the BLINK protocol incorporates methods of 'self-discovery' of the network devices 120b-d to the base station 140, auto-allocation of a unique ID, and intelligent responses from network devices 120b-d within allocated time slots, within a particular timecode frame. For example, the base station 140 can receive ID requests from the transceiver modules 150a-b switched on in range. In response, the base station 140 can issue a unique ID to one or more of the transceiver modules 150a-b devices. This adaptability contributes to a protocol that is scalable depending on the processing power available within the hardware.

In some examples, the BLINK protocol can address a target device (e.g., a specific camera) or global commands to devices (e.g., all cameras). The use of the BLINK network 103 coupled with an Ethernet, Wi-Fi or Bluetooth bridge, also allows a user to remotely monitor the status of all devices using a single application (e.g., a GUI).

The base station 140 can include a visual display 270 which presents or displays information related to the control of master clock base station 140 and can be an LCD, LED, plasma, or another type of display technology. An external control 180 is any device that can act as a remote visual display and configuration utility.

Figure 3:
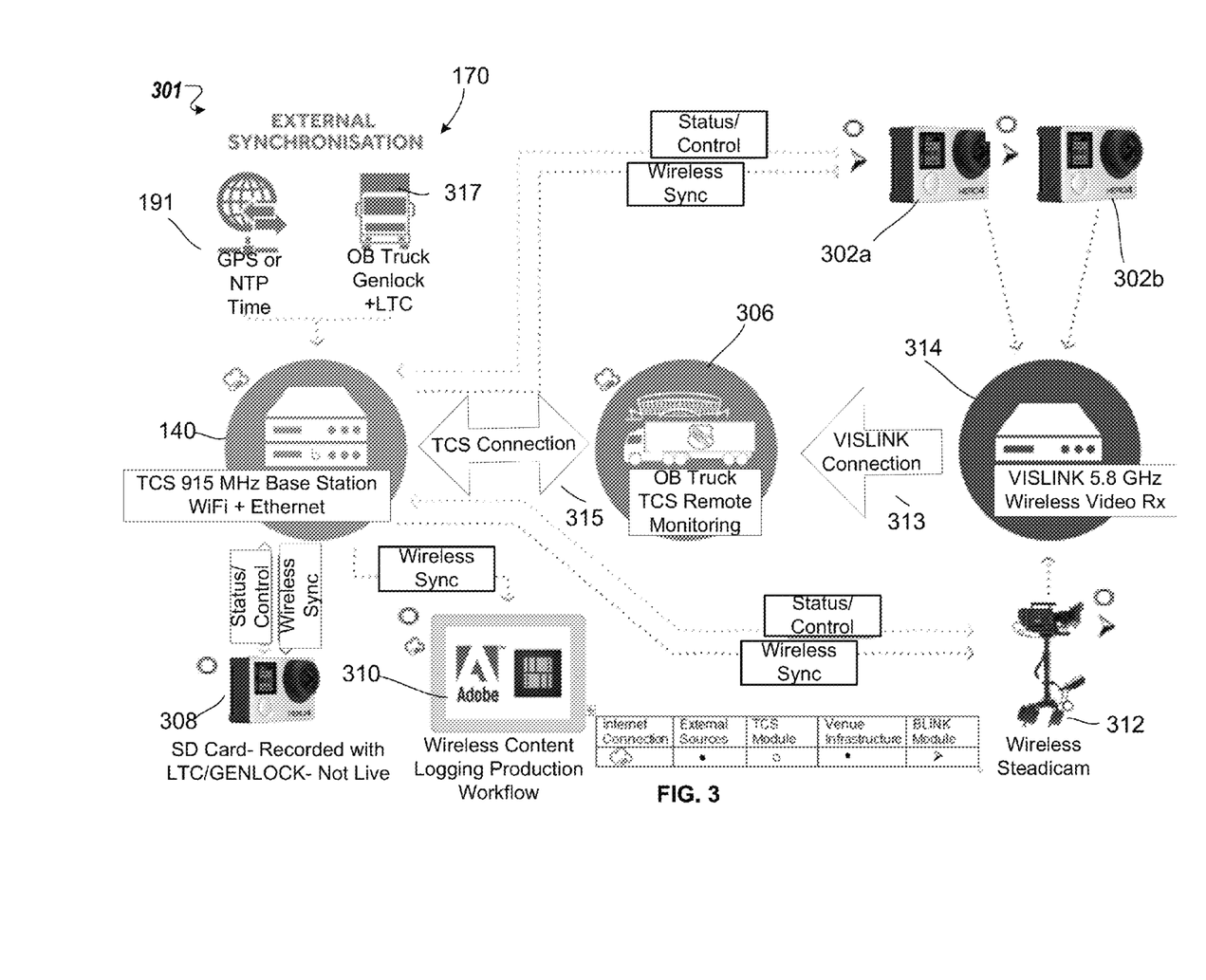
FIG. 3 is a schematic illustrating an exemplary environment having a remote monitoring station (e.g., an outside broadcasting "OB" truck) and multiple personal cameras (e.g., Hero4 cameras by GoPro®).
Figure 4:
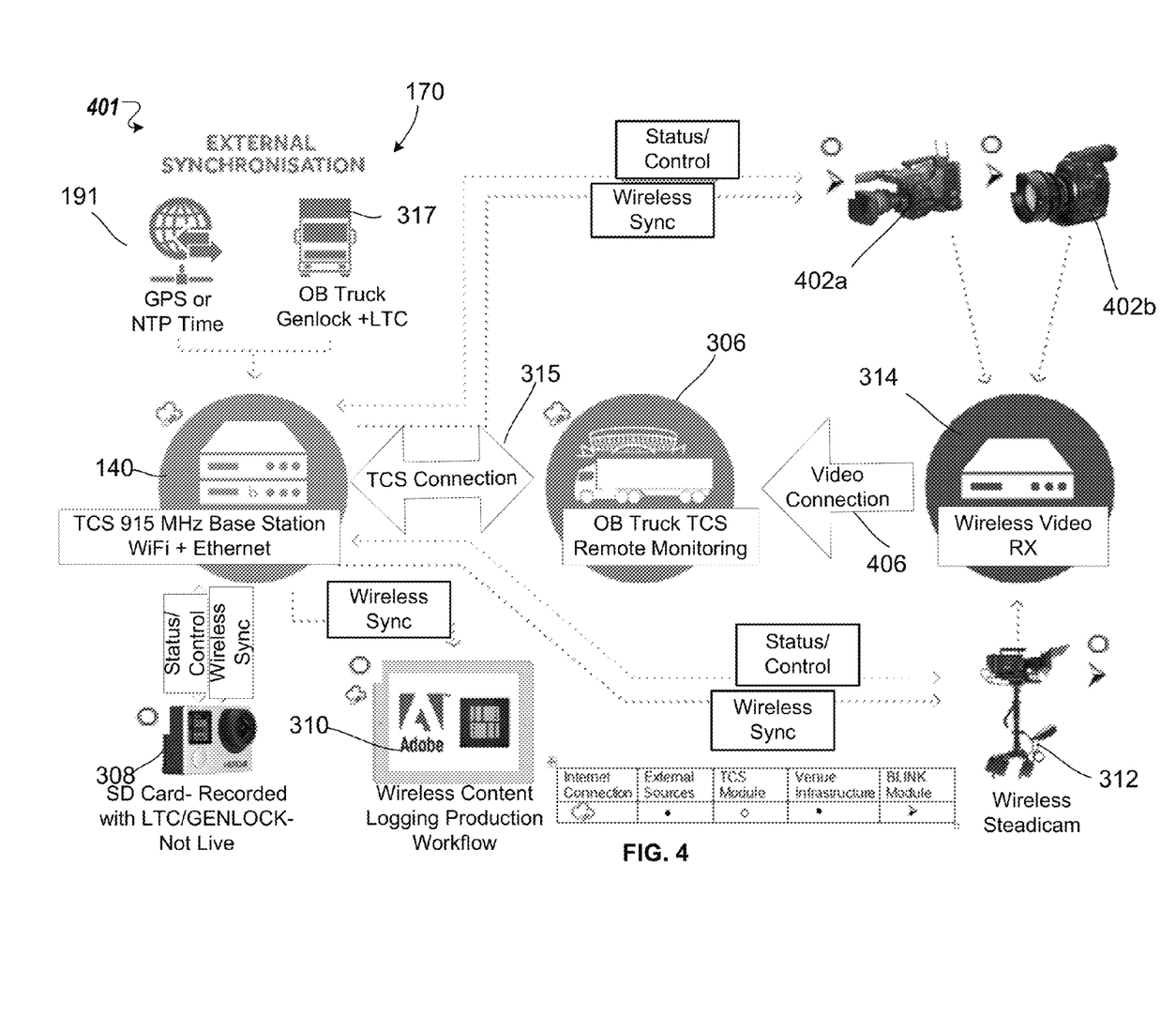
FIG. 4 is a schematic illustrating an exemplary environment having a remote monitoring station (e.g., an OB truck) and multiple professional cameras.

Referring to FIGS. 3-4, in some cases, the system 301, 401 ensures that an external sync source 170 generated by an outside broadcast vehicle 317 is used to accurately deliver wireless sync information to multiple portable units. This synchronization helps to ensure that all outside broadcast wired equipment is kept in sync with all wirelessly connected equipment. The status and configuration from each of these wireless devices are relayed and multiplexed in a data stream back to the base station 140.

In some examples, a plurality of cameras can be synchronized for the duration of an event (e.g., an activity at a stadium, a sporting event, a concert, filming a movie, and/or filming a commercial). In these examples, the cameras 302a-b can include one or more personal camera 302a-b, 308 (e.g., GoPro® cameras) and/or one or more professional cameras 312 and 402a-b. The cameras (e.g., the personal cameras 302a-b, 308 or the professional cameras 312 and 402a-b) provide information to a remote monitoring station 306 (e.g., an OB truck) using a wireless connection to a wireless video recorder 314. The information is sent from a wireless video recorder 314 over a VISLINK connection 313. The base station 140 can receive synchronization data from the external sync source 170 (e.g., GPS, PTP, NTP external sync inputs) from sources external to the system 301. As discussed above, the base station 140 can simultaneously send and receive information to the remote monitoring station 306 while also sending exchanging information with various SD cards, content logging applications 310, and cameras (e.g., personal cameras 302a-b and professional cameras 312 and 402a-b). Thus, the cameras within a system 301, 401 are wirelessly genlocked to each other and the remote monitoring station 306 (e.g., an OB truck) via the base station 140. In some examples, each of the cameras is genlocked within <10 μS of the other cameras or system components.

In some examples, the timecode data is embedded on an SD card of the camera 308 so that the SD card can be removed and taken back to the remote monitoring station 306 for fast and easy processing of media. In this case, the media is recorded with the LTC/Genlock information, but the information is not synced with the other components in real time. The media including the LTC/Genlock information is later sent to the remote monitoring station 306 via a wireless sync with the base station 140.

In other examples, the base station 140 also provides RF or Wi-Fi timecode sync via a TCS Wi-Fi SDK or a TCS BLINK adapter for use with one or more content logging applications 310 (e.g., applications developed by GoPro® or Adobe Live Logger®). For example, the network devices 120b-c can include a BLINK adapter to enable syncing across consumer devices (e.g., smartphones, tablets, personal cameras, and mobile devices). In these examples, the network devices 120b-c can communicate with the base station 140 about the status and/or control of the various devices within system 101. The base station 140 can gather multiplexed GoPro camera status information via BLINK and return this information to a single GUI in the remote monitoring station 306. The camera status information can include SD card status, battery status, recording status, or a combination thereof. In some examples, the BLINK adapter can connect to one or more devices using an apple lighting or mini USB connection. In some cases, the base station 140 can control multiplexed GoPro cameras such as remote control, start/stop record, camera on/off, highlight metadata tags. In some cases, the base station 140 can control $3^{rd}$ party equipment connected to the GoPro camera; such as wireless video transmitters and drone motor control.

Figure 5:
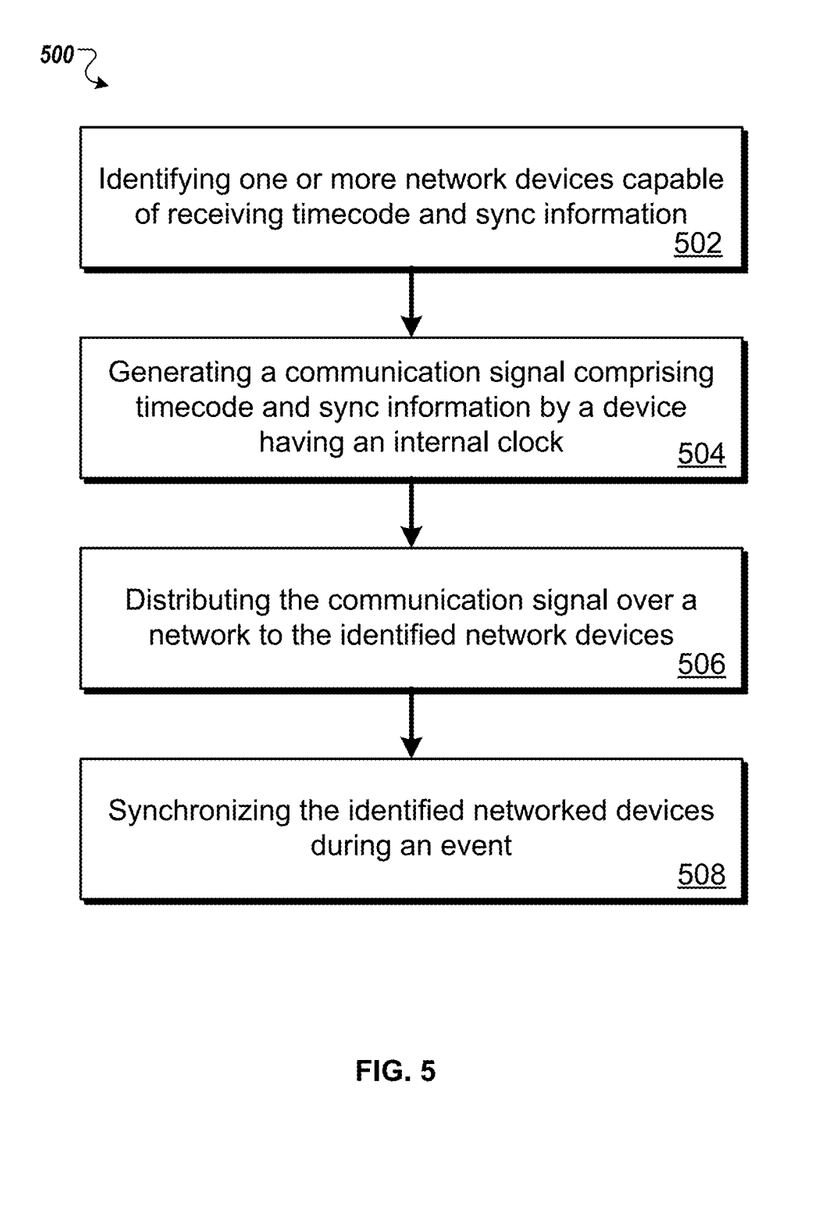
FIG. 5 is a flowchart of an example process for synchronizing timecode and genlock data during an event.

Referring to FIG. 5, in operation 500 the base station 140 identifies 502 one or more network devices (e.g., audio or visual recording equipment) capable of receiving timecode and/or synch information. The base station 140 can then generates 504 a communication signal using an internal clock. The communication signal includes timecode, sync, and/or metadata information. The communication signal can then be distributed 506 over a network to the identified network devices using a wireless or wired connection. After distributing the communication signal, the base station 140 can synchronize 508 the identified network devices over a period (e.g., a live or pre-recorded event).

Figure 6:
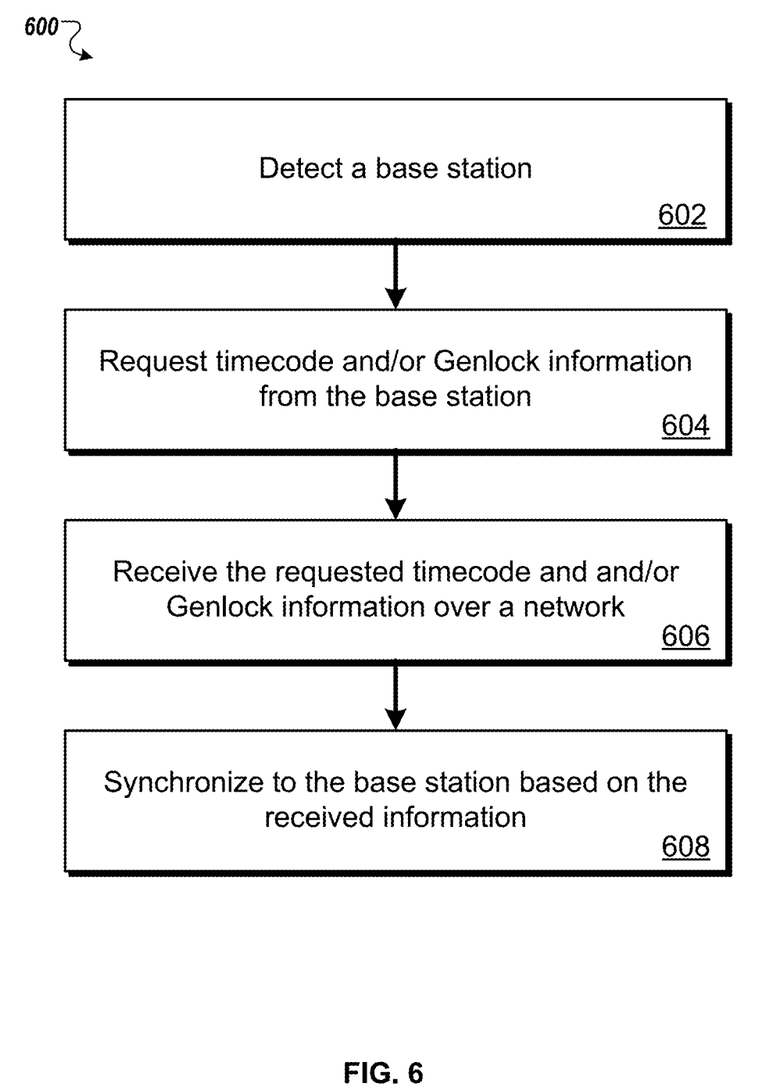
FIG. 6 is a flowchart of an example process for a camera to initiate and synchronize with a base station during, for example, an event.

Referring to FIG. 6, in some cases, a device (e.g., a personal or professional audio or video recorder) can initiate 600 the synchronization process. For example, the device can detect 602 a base station near the device. The device can then request 604 timecode and/or genlock information from the base station. After the device receives 606 the requested timecode and/or genlock information over a connection, the device can synchronize 608 to the base station based on the received information. This can help to ensure that any cameras near a base station are synchronized with the base station. This can be useful during an event, for example.

Figure 7:
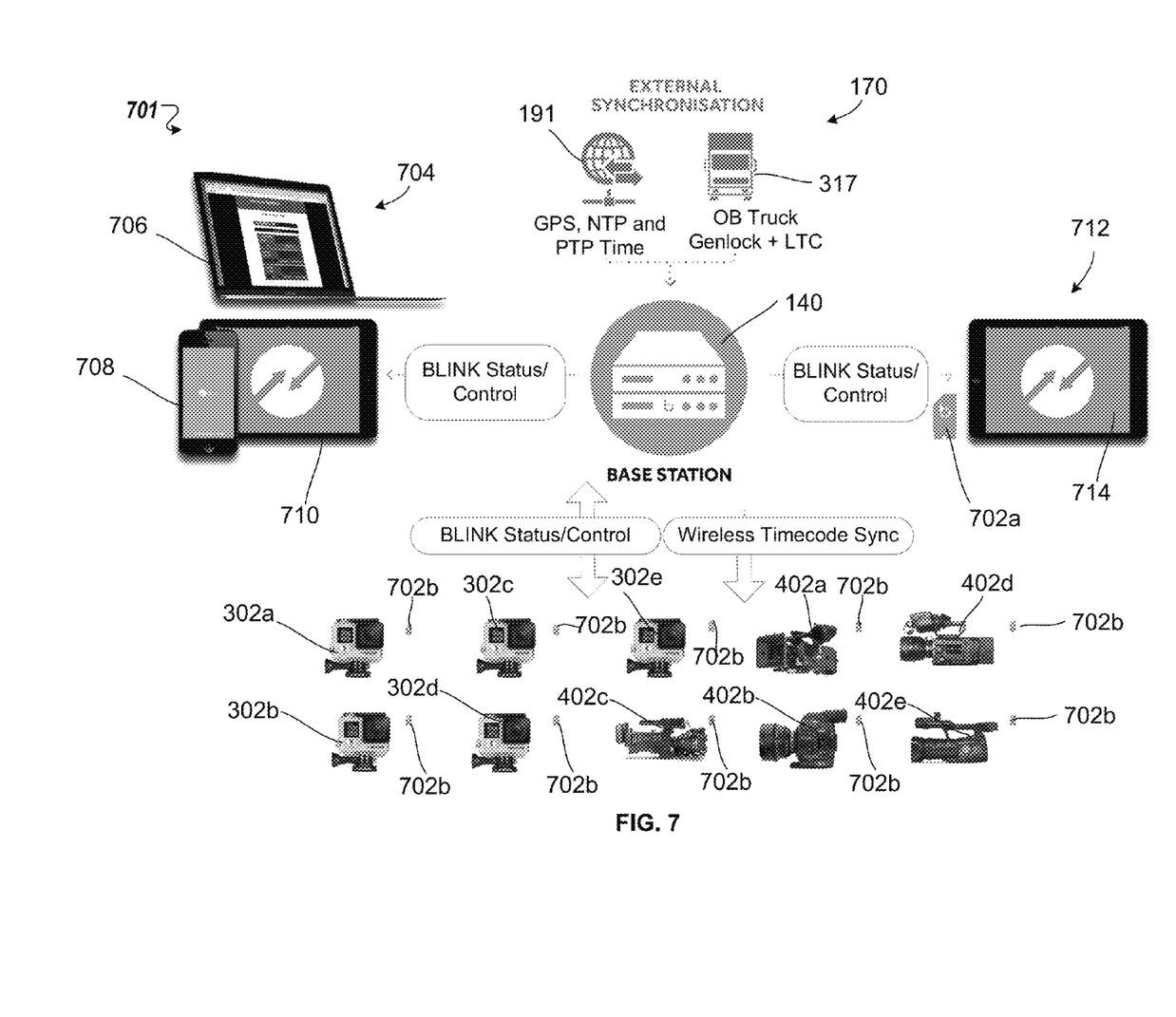
FIG. 7 is a schematic illustrating an exemplary environment for synchronizing timecode and genlock data between multiple personal media devices and professional media devices. The synchronization and/or the media devices can be monitored and, in some cases, controlled by multiple computing devices including personal computing devices.

Referring to FIG. 7, a synchronization system 701 is shown that is configured to synchronize a combination of personal and professional cameras and communicate status and control information from the cameras to multiple networked devices over two wireless networks. For example, the synchronization system 701 includes personal cameras 302a-e and professional cameras 402a-e. Each of the cameras can include a BLINK adapter 702b which is generally similar to the transceivers 150a-b described above Each of the cameras can also include modules enabling the camera to communicate over Wi-Fi, Bluetooth, or other wireless networks. In this example, the base station 140 sends timecode sync information to each of the cameras using a compatible wireless network. Simultaneously, the base station 140 can also exchange (e.g., pushing and pulling information) status and/or control information with each of the cameras 302a-e, 402a-e over the BLINK network 103 using the BLINK adapters 702b. The base station 140 can share the received status and/or control information from the cameras 302a-e, 402a-e with one or more networked devices 704, 712. In this example, the base station 140 sends status and/or control information over a wireless connection to a laptop 706, a phone 708, and a tablet 710. This wireless connection can use Wi-Fi, Bluetooth, and/or an Ethernet connection. The base station 140 can also send the received status and/or control information to another device (e.g., a tablet 714) using the BLINK network. In this example, the tablet 714 is connected to a BLINK adapter 702a, which acts in a similar manner to the transceivers 150a-b.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Computer readable media suitable for storing computer program instructions and data include all forms of nonvolatile or volatile memory, media and memory devices, including by way of example semiconductor memory devices, e.g., EPROM, EEPROM, and flash memory devices; magnetic disks, e.g., internal hard disks or removable disks or magnetic tapes; magneto-optical disks; and CD-ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a LAN and a WAN.

Various modifications of the systems and methods and many further embodiments thereof, in addition to those shown and described herein, will become apparent to those skilled in the art from the full contents of this document, including references to the scientific and patent literature cited herein. The disclosure herein contains information, exemplification, and guidance that can be adapted to the practice of the concepts described herein in their various embodiments and equivalents thereof.

What is claimed is:

1. A device for timecode and metadata distribution, the device comprising:
    a timecode generator circuitry including an internal clock, the timecode generator circuitry configured to generate the timecode, wherein the timecode generator circuitry further comprises a timecode oscillator configured to provide the timecode and sync information through at least one of a temperature compensated crystal oscillator ("TCXO") reference oscillator, an oven-controlled crystal oscillator ("OXCO") reference oscillator, and a rubidium atomic clock;
    a radio frequency ("RF") transceiver configured to transmit and receive the timecode and the sync information over an RF signal;
    a network controller circuitry configured to provide wired and wireless network access for distribution of the timecode and the sync information; and
    a display configured to display at least the timecode to a user.

2. The device of claim 1, further comprising a non-transitory computer readable media device storing instructions that are executable by a processing device to perform operations comprising:
    identifying one or more network devices capable of receiving the timecode and the sync information;
    generating a communication signal comprising the timecode and the sync information;
    distributing the communication signal over a network to the identified one or more network devices; and
    synchronizing the identified one or more network devices during an event.

3. The device of claim 1, further comprising a global positioning system ("GPS") receiver in communication with the timecode generator circuitry, the GPS receiver being configured to provide a sync signal to the internal clock.

4. A system comprising:
    a network;
    a base station comprising:
        timecode generator circuitry including an internal clock, the timecode generator circuitry configured to generate timecode, wherein the timecode generator circuitry further comprises a timecode oscillator configured to provide the timecode and sync information through at least one of a temperature compensated crystal oscillator ("TCXO") reference oscillator, an oven-controlled crystal oscillator ("OXCO") reference oscillator, and a rubidium atomic clock;
        a radio frequency ("RF") transceiver configured to transmit the timecode and the sync information over an RF signal;
        a network controller circuitry configured to provide wired and wireless access to the network for distribution of the timecode and the sync information; and
        a display configured to display the timecode to a user; and
    at least two cameras in communication with the base station over the network.

5. The system of claim 4, wherein the base station is configured to identify at least one of the at least two cameras or another camera capable of receiving the timecode.

6. A method for timecode and metadata distribution, the method comprising:
    generating, by a timecode generator circuitry including an internal clock, the timecode;
    providing, by a timecode oscillator comprised in the timecode generator circuitry, the timecode and sync information through at least one of a temperature compensated crystal oscillator ("TCXO") reference oscillator, an oven-controlled crystal oscillator ("OXCO") reference oscillator, and a rubidium atomic clock;
    transmitting and receiving, by a radio frequency ("RF") transceiver, the timecode and the sync information over an RF signal;
    providing, by a network controller circuitry, wired and wireless network access for distribution of the timecode and the sync information; and
    displaying, by a display, at least the timecode to a user.

* * * * *